J. T. KÖSTER.
ROLLING GATE FOR SLUICES.
APPLICATION FILED JULY 19, 1913.
1,073,424.
Patented Sept. 16, 1913.
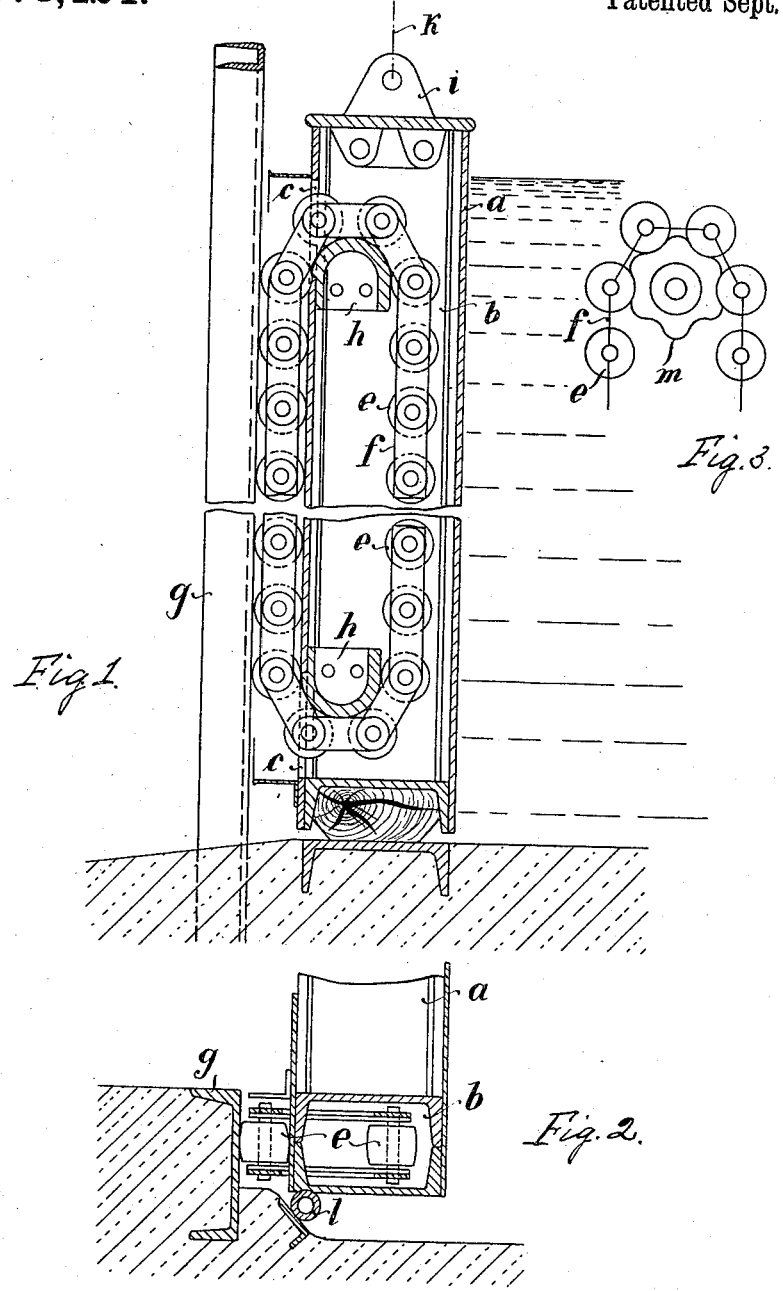

UNITED STATES PATENT OFFICE.

JOHANN THEODOR KÖSTER, OF KLAGENFURT, AUSTRIA-HUNGARY.

ROLLING GATE FOR SLUICES.

1,073,424. Specification of Letters Patent. Patented Sept. 16, 1913.

Application filed July 19, 1913. Serial No. 779,956.

*To all whom it may concern:*

Be it known that I, JOHANN THEODOR KÖSTER, a German subject, residing at 34 Bahnhofstrasse, Klagenfurt, Austria-Hungary, have invented new and useful Improvements in Rolling Gates for Sluices, of which the following is a specification.

Figure 1 is a vertical sectional view of my present improvement. Fig. 2 is a section at right angles to Fig. 1. Fig. 3 is a diagrammatic view of a modification.

The rolling gate for sluices hereafter described and illustrated by the drawing has for its object to decrease the power required for hoisting the gate which is acted upon by high water pressure. With the known devices of this kind a so-called rolling carriage is provided on which a pressure shoe bears rigidly or jointedly connected with the gate. This arrangement has different defects of constructional nature and besides is very expensive. Moreover there is a construction having an endless roller chain disposed within the hollow sluice pillars. Such construction is most defective because the hollow sluice pillars are under the influence of water if the gate has been elevated even to a small extent only (for regulating the water level) or if the water level is above the upper edge of the gate, and this even in case the back portions of the gates are tightened with regard to the sluice pillars. Consequently these hollow spaces will be converted into blocks of ice in frosty weather so that the gate cannot be raised or lowered. Moreover, when the gate has been raised, sand, rubble, and dirt will accumulate in the hollow spaces; and cleaning being impossible because of the flowing water, the gate cannot be closed. Such a construction of rolling gates is thus worse than a simple slide gate, as it is able to cause a catastrophe under certain circumstances. If, however, the construction were improved by avoiding the hollow sluice pillars, then that portion of the chain which is on the back of the gate can be injured by floating bodies.

The present invention, which represents a novel kind of rolling gates, is to overcome the said defects. The rolling carriage here likewise forms an endless chain. The roller chain consists of a number of rollers $e$ of suitable or desired diameter which are jointed together by links $f$. The bolts of these links are best made of a metal that cannot rust. According to the invention the gate $a$ is provided on both sides with two oppositely disposed flanged members forming hollow spaces or pockets $b$ extending from top to bottom in which the free portion of the chain is adapted to move protected from impact and from water. The gate with its hollow spaces $b$ bears, on the side of the downstream water, on the rollers $e$ by which the water pressure is transmitted on the sluice pillars $g$. Thus when the gate $a$ moves downward or upward, merely friction of rolling takes place. On the side of the downstream water the hollow spaces $b$ are provided with slit openings $c$ while at any other place they are water tight. Through the openings $c$ the roller chain passes when moving into the hollow spaces $b$ or leaving them. The chain itself is conducted by slide blocks $h$ (or sprocket wheels $m$ as shown in Fig. 3) so that it is always correctly guided and cannot be thrown into disorder. Each roller which gets inoperative is thus replaced by another roller so that the gate always moves on an equal number of rollers. The specific roller pressure can therefore be relatively small together with the roller chain.

As the chains on the gate can never project from the under edge of the gate, floating bodies are prevented from injuring the chains. Besides, the portions of the chains which are on the side of the downstream water may be protected from splashing water or ice and the like by suitable means, which is impossible with the known rolling carriage with which the chain moves relatively to the gate, and is also impossible with the known rolling gate having an endless chain as already stated. The lateral tightening of the gate $a$ may be effected by the means hitherto employed to such end, such, for instance, as by tubes $l$, &c. The roller boxes $b$ may extend, if desired, above the level of the upstream water and be provided with the eyes $i$ designed to receive the hoisting chains or rods $k$. The eyes $i$ may be disposed to close the boxes $b$ in a water-tight manner at the same time.

The upper and lower ends of the gate projecting beyond the supporting rollers may serve as cantalivered beams as far as the strength of the gate construction permits.

What I claim is:

A rolling gate for sluices having at the end a pocket extending from top to bottom and formed of oppositely disposed flanged members having their flanges facing each other, rigid blocks in said pockets, said gate having openings for the run of the chain, and an endless roller chain disposed in said pocket and running on said blocks and passed through said openings for contact with a sluice pillar.

In witness whereof I have hereunto signed my name this first day of July 1913, in the presence of two subscribing witnesses.

JOHANN THEODOR KÖSTER.

Witnesses:
 HUGO ZAG,
 STEFAN BERGER.

Copies of this patent may be obtained for five cents each, by addressing the "Commissioner of Patents. Washington, D. C."